June 11, 1957 R. E. J. NORDQUIST 2,795,453
CAN HANDLING DEVICE
Filed April 26, 1954
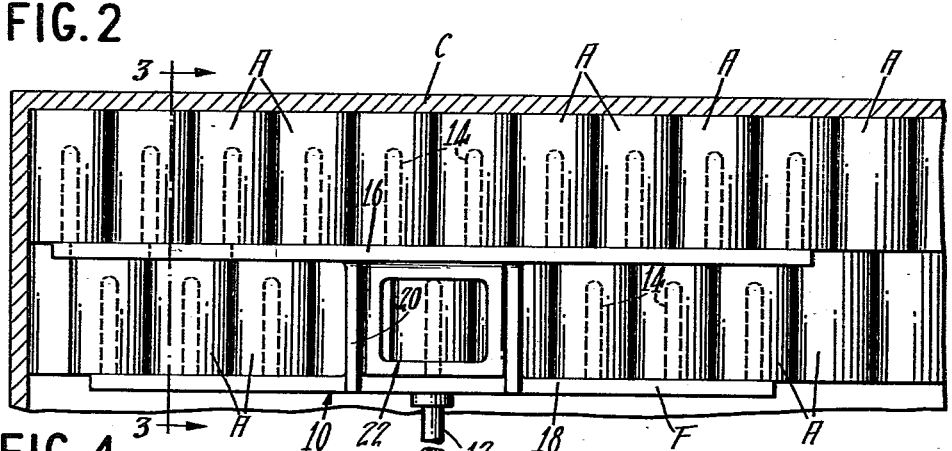
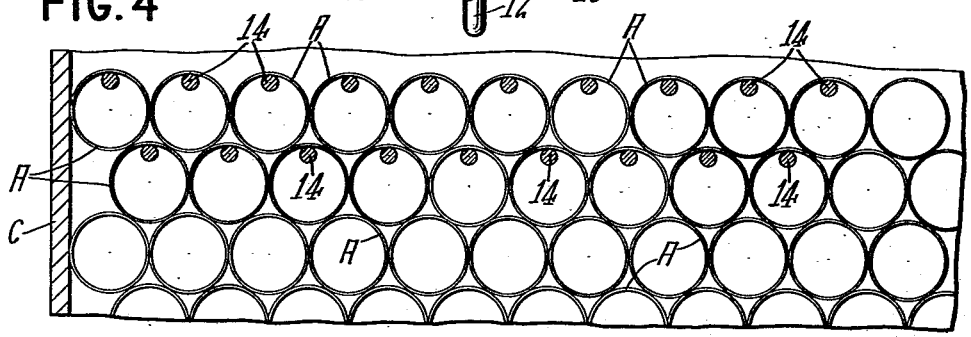
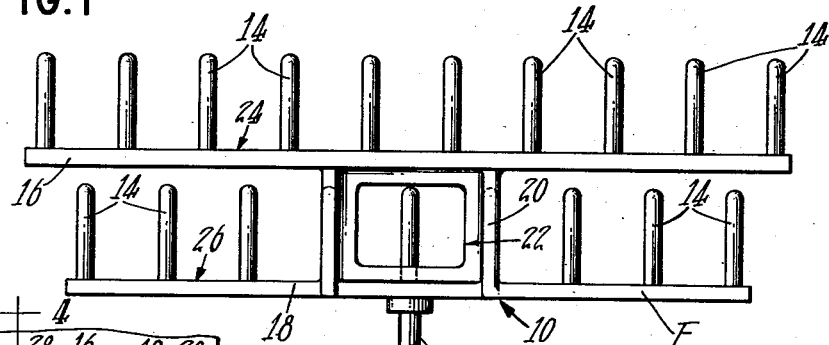
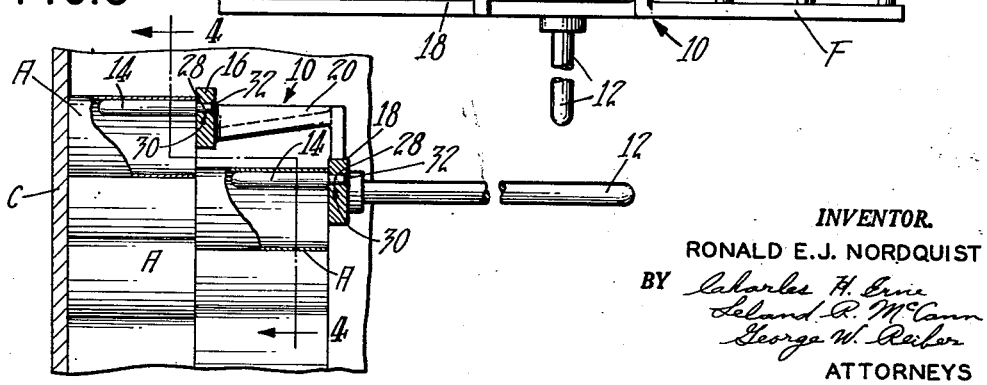
INVENTOR.
RONALD E.J. NORDQUIST
BY
ATTORNEYS United States Patent Office 2,795,453
Patented June 11, 1957

2,795,453
CAN HANDLING DEVICE

Ronald E. J. Nordquist, Maplewood, N. J., assignor to American Can Company, New York, N. Y., a corporation of New Jersey Application April 26, 1954, Serial No. 425,383

6 Claims. (Cl. 294—15)

The present invention relates to devices for handling tubular articles such as empty cans or the like, and has particular reference to a can lifting fork provided with can engaging fingers or tines which are arranged in a plurality of offset rows to facilitate the handling of a multiplicity of rows of cans disposed in stepped relationship.

It is common practice in the can manufacturing industry to stack empty cans in bulk in freight cars or storage bins as an incident to shipment or storage. The cans are usually arranged in the cars or bins in transverse vertical tiers, each of which is built up of a large number of superposed horizontal rows. The stacking of the cans is done manually by loaders or operators who utilize single row loading forks to remove the cans from conveyors which carry them directly from the automatic can manufacturing machines. As a consequence of the high speeds at which modern can manufacturing equipment is being run, a problem has arisen in that the loaders find it difficult to keep pace with the delivery of the cans. This sometimes makes it necessary to shut down the manufacturing machines to prevent the cans from clogging the delivery conveyors. Such shutdowns are of course uneconomical and therefore highly undesirable.

The present invention provides a solution of this problem by making it possible for the loaders to handle two or more rows of cans simultaneously and thus increase their efficiency to a point where they are able to keep up with the output of high speed automatic equipment.

An object of the invention therefore is the provision of a simply constructed, lightweight can fork of increased can handling capacity.

Another object is the provision of a can fork having two or more rows of can holding fingers arranged to permit the handling of cans disposed in a plurality of stepped rows so that a row of cans can be added to or be removed from a plurality of vertical tiers in each loading or unloading stroke.

Still another object is the provision of an article handling fork which enables the operator to handle two or more rows of articles in each stroke, the rows being arranged in stepped relationship to prevent interference between the cans in the different rows and thus to facilitate the loading of the cans on the fork.

Numerous other objects and advantages of the invention will be apparent as it is better understood from the following description, which, taken in connection with the accompanying drawings, discloses a preferred embodiment thereof.

Referring to the drawings:

Figure 1 is a plan view of a device embodying the principles of the instant invention, parts being broken away;

Fig. 2 is a plan view similar to Fig. 1, but showing the tines or fingers of the device in engagement with several stepped rows of tubular articles which form a portion of a stack which is disposed within a storage compartment, parts being shown in section and other parts being broken away;

Fig. 3 is a vertical section taken substantially along the line 3—3 in Fig. 2, parts being broken away; and Fig. 4 is a section taken substantially along the line 4—4 in Fig. 3, parts being broken away.

As a preferred or exemplary embodiment of the present invention the drawings illustrate a lifting fork F adapted to facilitate the loading or unloading of tubular articles A into or out of a compartment C which usually is either a freight car or a storage bin. The tubular articles A may be empty can bodies having at least one end open.

The lifting fork F, which preferably is made of a lightweight metal such as aluminum or magnesium, comprises a frame 10 having secured thereto a handle 12 and a plurality of parallel can-supporting fingers or tines 14. As seen in the drawings, the frame 10 includes a pair of elongated bars 16, 18 which are connected by means of a bridge member or web 20 which is substantially L-shaped in cross-section (see Fig. 3). The bridge member 20 preferably is cut away as at 22 to reduce the weight of the fork F to a minimum.

As best seen in Fig. 3, the bars 16, 18 are parallel to but offset from each other both vertically and horizontally, and carry the can-supporting fingers 14 which project at equally spaced intervals from the outer faces 24, 26 of the bars 16, 18, respectively. The fingers 14 are provided at their bases with integral pins 28 which fit into bores 30 formed in the support bars 16, 18. The ends of the pins 28 are peened or upset into shallow countersinks 32 formed at one end of the bores 30 to permanently secure the fingers 14 to the bars 16, 18.

The fingers 14 carried by the upper bar 16 are aligned to form a row disposed in a common plane, while those carried by the lower bar 18 form a similar row which is disposed in a lower plane parallel to the first plane. Due to the horizontal offsetting of the bars 16, 18, the fingers 14 in the upper row project outwardly beyond those in the lower row.

As a result of this construction, the fork when fully loaded carries two horizontal rows of cans A which are disposed in stepped relationship (see Fig. 3). To prevent gaps between the ends of the cans A in the stepped rows, the bars 16, 18 are offset horizontally a distance substantially equal to the length of the cans. To prevent the cans A from tilting and falling off the fork F, the length of the can-supporting fingers 14 should at least equal and preferably somewhat exceed one half the length of the cans.

Since the cans A are preferably stacked in vertical tiers in which each horizontal, superposed row is laterally staggered with respect to its subjacent row a distance equal to the radius of a can in order to obtain the most compact and efficient arrangement (see Figs. 1, 2 and 4), the two rows of can supporting fingers 14 are laterally staggered with respect to each other to produce this desired can pattern.

In operation, the loader grasps the handle 12 of the fork F and inserts the can-supporting fingers 14 into the open ends of the cans A until the cans engage against the bars 16, 18 which act as stop members. The novel offset positioning of the rows of fingers 14 makes it possible to obtain a full fork-load of articles A without difficulty since there is no interference between the cans A in the different rows. The loader then lifts the fork F and deposits the cans in a stack in the freight car or storage bin C. Although two rows of cans A are handled at each stroke of the fork F, the stepped relationship of the two rows results in the deposition of each of the rows on a different vertical tier of the stack. As a result, it is possible to quickly build up a stack while maintaining a variation in height of never more than a single row of cans between adjacent tiers. This can be clearly seen in Fig. 3. Thus, the stack can be built up in a manner which minimizes the tendency of the articles in the tiers to topple over.

In the loading of cans it frequently becomes necessary to handle only a single row in order to start a stack or to level-off the tiers. At such times, only one of the rows of fingers 14 would be utilized and, if necessary, the fork F may be used in inverted position to reach into corners.

It is obvious that the fork F can also be used to advantage in the unloading of the cans A from the stack. It is also obvious that the fork F need not be limited to two rows of can-supporting fingers 14, but may be constructed to handle any reasonable multiplicity of stepped rows of cans A by simply adding to the number of bars 16, 18 and offset rows of fingers 14.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A device for handling tubular articles, comprising a frame having a plurality of parallel, article engaging fingers extending therefrom, said fingers being arranged in a plurality of vertically spaced parallel rows vertically and horizontally offset from each other, the fingers of one of said rows being disposed in advance of the fingers of another of said rows, whereby to facilitate the simultaneous handling of articles contained in a plurality of tiers thereof arranged in adjacent stepped relationship.

2. A device for handling empty cans or like tubular articles, comprising a frame having a plurality of parallel, article engaging fingers extending therefrom, said fingers being arranged in a plurality of rows disposed in parallel planes and offset both vertically and horizontally from each other, the fingers of one of said rows being positioned in advance of and extending beyond the free ends of the fingers of another of said rows, whereby to facilitate the simultaneous handling of articles contained in a plurality of tiers thereof arranged in juxtaposed stepped relationship.

3. The device of claim 2 in which the frame includes a plurality of spaced interconnected parallel support bars, each of which carries one of said finger rows.

4. The device of claim 2 in which said finger rows are horizontally offset from each other a distance substantially equal to the length of said articles.

5. The device of claim 2 in which said article engaging fingers have a length equal to at least half the length of said articles.

6. The device of claim 2 in which the article engaging fingers in one row are disposed in horizontally staggered relation to the fingers in an adjacent row.

References Cited in the file of this patent

UNITED STATES PATENTS

| | | |
|---|---|---|
| 269,557 | Banvoetz | Dec. 26, 1882 |
| 1,252,226 | Bank et al. | Jan. 1, 1918 |
| 1,350,984 | Blank et al. | Aug. 24, 1920 |